United States Patent [19]

Mueller et al.

[11] Patent Number: 4,603,385
[45] Date of Patent: Jul. 29, 1986

[54] INTEGRATED DATA PROCESSING/TEXT PROCESSING SYSTEM HAVING A TERMINAL WITH DUAL EMULATION AND ENHANCED FUNCTION CAPABILITIES

[75] Inventors: Mark W. Mueller, Cedar Park; Kevin L. Hill, Austin; Gary T. Hunt, Austin; Ronald Smetana, Austin; James M. McVey, Florence; Ernest L. Miller, Georgetown; Silous F. Clements, Georgetown, all of Tex.

[73] Assignee: International Business Machines Corp., New York, N.Y.

[21] Appl. No.: 493,579

[22] Filed: May 11, 1983

[51] Int. Cl.⁴ .................. G06F 3/153; G06F 7/00; G06F 15/20
[52] U.S. Cl. ................................. 364/200
[58] Field of Search ... 364/200 MS File, 900 MS File

[56] References Cited
U.S. PATENT DOCUMENTS

| | | | |
|---|---|---|---|
| 4,290,063 | 9/1981 | Traster | 340/723 |
| 4,458,311 | 7/1984 | Clements et al. | 364/200 |
| 4,470,127 | 9/1984 | Thompson | 364/900 |
| 4,495,566 | 1/1985 | Dickinson et al. | 364/200 |
| 4,503,499 | 3/1985 | Mason et al. | 364/200 |
| 4,509,121 | 4/1985 | Rey et al. | 364/200 |

Primary Examiner—James R. Hoffman
Attorney, Agent, or Firm—Harold E. Meier

[57] ABSTRACT

The present invention describes an integrated text and data processing system allowing processing of link data before output. The system also provides simultaneous dual emulation of a display and printer normally associated with a host data processor. In accordance with the first aspect of the invention, an input/output terminal includes a support logic circuit for interconnecting the input/output terminal to a port of an intermediate control unit attached to a central processing unit. The input/output terminal includes separate link and display buffers whereas link data may be stored in the link buffer for processing before output to the display associated with a text processor. In accordance with another aspect of the invention, the input/output terminal may include a plurality of support logic circuits each connected to one of the ports of one or more control units associated with one or more central processing units. This structure allows the text processor in the input/output terminal to simultaneously yet independently emulate a display and printer normally associated with a host central processing unit.

15 Claims, 7 Drawing Figures

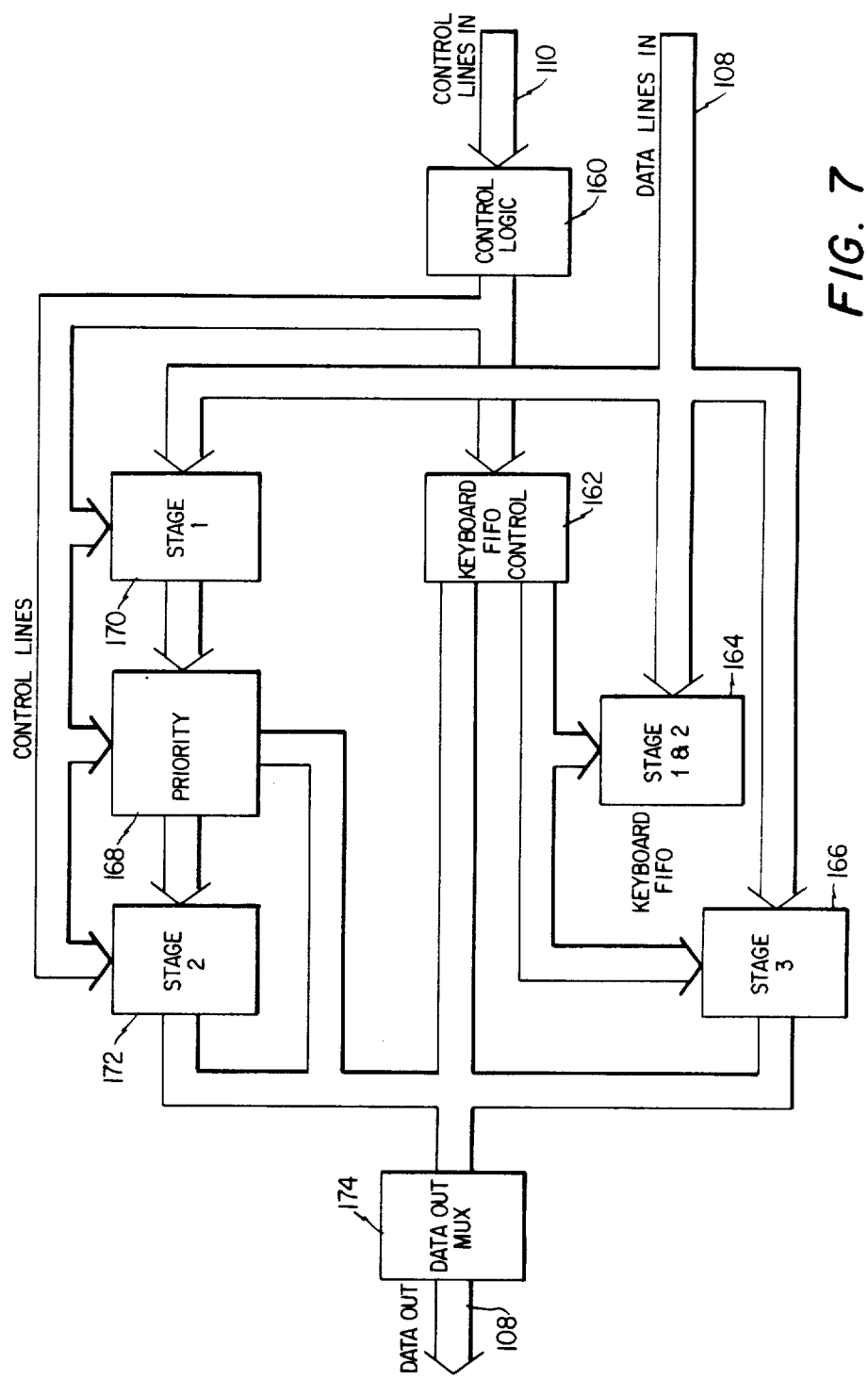

INTEGRATED DATA PROCESSING/TEXT PROCESSING SYSTEM HAVING A TERMINAL WITH DUAL EMULATION AND ENHANCED FUNCTION CAPABILITIES

TECHNICAL FIELD

The present invention relates to an integrated text and data processing system having a terminal which allows processing of link data before output and which provides simultaneous yet independent emulation of a display and printer normally associated with a host data processor.

BACKGROUND ART

Often, a user desires both the text processing functions of a text processor and access to a host data processor for data processing through a low cost data link. One solution to this problem is to utilize both a conventional text processor and a data display or printer compatible with the data processor. Such displays or printers are well known, e.g., the IBM 3278 Display Station and the IBM 3287 Printer, respectively. These devices essentially receive link data from the data processor and output it directly to the user. Another more desirable solution is to utilize the display or printer associated with the text processor as an output terminal for the host data processor. A system of this type has been described in copending U.S. patent application Ser. No. 310,184, filed Oct. 9, 1981, to Clements et al, now U.S. Pat. No. 4,458,311. In this application, an interactive system is provided which has the capability of switching from a text processing session to a data processing session wherein the text processor emulates a control unit and associated input/output terminals. While utilization of a text processor as a display and/or printer for a host data processor has produced satisfactory results, such a combination does not allow the user to process the formatted data before it is displayed on the display terminal. This is because the text processor cannot support the protocol normally associated with a control unit in a host data processor configuration. Moreover, this approach does not allow simultaneous yet independent use by the host data processor of both the display and printer associated with the text processor. Also, this approach is not functionally costeffective.

Therefore, there is a need for a terminal for use in an integrated text and data processing system which allows a user to process link data before output, and which provides simultaneous yet independent emulation of both the display and printer normally associated with the host data processor.

SUMMARY OF THE INVENTION

In accordance with one aspect of the present invention, an input/output terminal for use in an integrated text and data processing system is provided with enhanced function capability. Specifically, the system comprises a central processing unit, a plurality of input/output terminals for the central processing unit, and a control unit having a plurality of ports, each of the ports connected to one of the input/output terminals for interfacing and multiplexing the input/output terminal with the central processing unit. In accordance with the invention, at least one of the input/output terminals comprises support logic for interconnecting the input/output terminal to one of the ports of the control unit, a buffer connected to the support logic for storing link data received from or to be transmitted to the central processing unit, and a conventional text processor having associated therewith a display and/or printer. By utilizing a distinct buffer separate from the display buffer associated with the text processor, link data may be stored before being output. Therefore, an operator may process this data; e.g., by input of keystroke information through the text processor. This processing of link data is carried out in a transparent fashion with respect to the central processing unit, i.e., the host processor thinks it is dealing with a display or printer normally associated therewith.

Therefore, in accordance with this aspect of the invention the text processor of the input/output terminal emulates a conventional display or printer associated with the central processing unit. However, since link data can now be processed, the input/output terminal is "smarter" than the conventional display or printer. Specifically, this processing capability allows the function of the terminal to be enhanced without the participation or even knowledge of the central processing unit.

In accordance with another important feature of the present invention, an input/output terminal for use in an integrated text and data processing system is provided which allows simultaneous yet independent use by one or more central processing units of both the display and printer associated with a conventional text processor therein. In this alternate embodiment, the system comprises one or more central processing units, a plurality of input/output terminals for each of the central processing units, and one or more control units having a plurality of ports, each of the ports connected to an input/output terminal for interfacing and multiplexing the input/output terminal with one or more of the central processing units. At least one of the input/output terminals comprises a plurality of support logic means each connected to one of the ports of one or more of the control units, a link buffer connected to each of the support logic means for storing link data received from or to be transmitted to one of the central processing units, a conventional text processor, and output means connected to the text processor for outputting link data and text character information. By utilizing a plurality of support logic means in the input/output terminal, the text processor of this terminal can simultaneously emulate both a display and printer normally associated with a central processing unit. This dual emulation is also transparent regardless of whether the host is the same central processing unit, or separate central processing units accessing the terminal through a plurality of control units.

BRIEF DESCRIPTION OF THE DRAWING

For a more complete understanding of the present invention and the advantages thereof, reference is now made to the following Description taken in conjunction with the accompanying Drawings in which:

FIG. 7 is a detailed schematic diagram of the poll response logic of FIG. 6.

DETAILED DESCRIPTION

Figure 1:
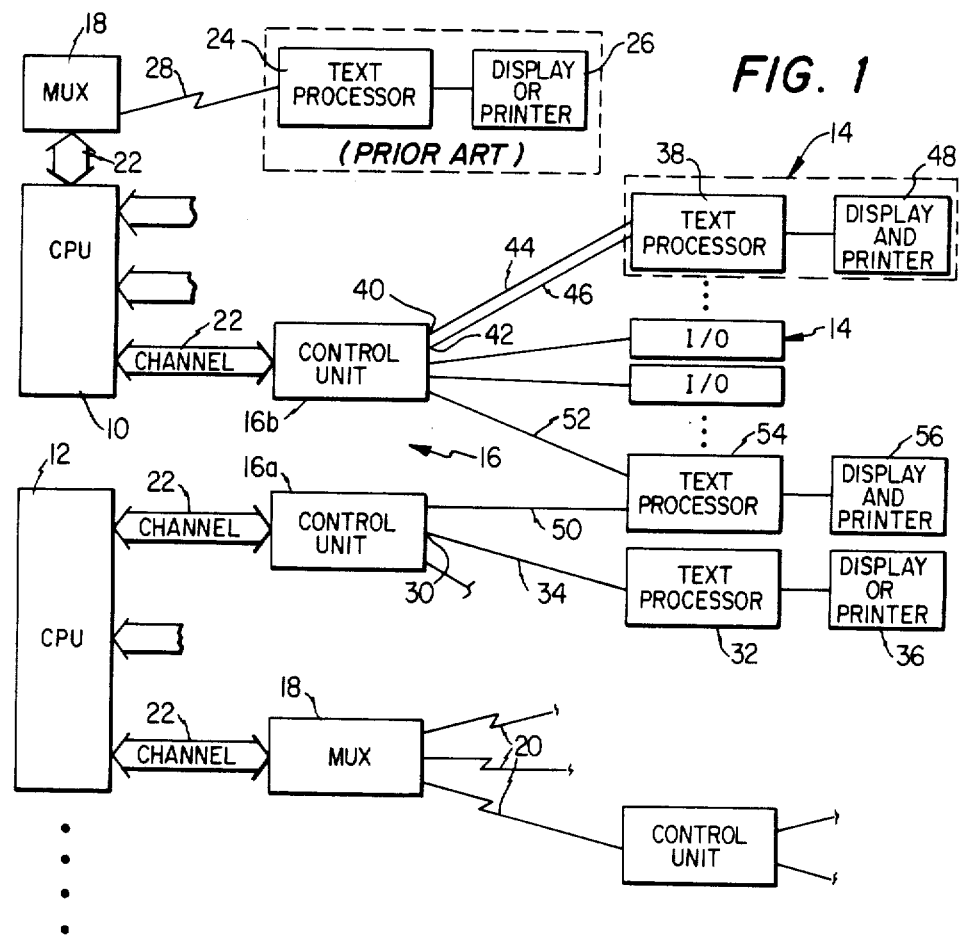
FIG. 1 is a block diagram of an integrated data processing/text processing system having a plurality of central processing units and input/output terminals.

Referring now to the drawings wherein like reference characters designate like or similar parts throughout the several view, FIG. 1 is a block diagram of an integrated data processing/text processing system incorporating several features of the present invention. This integrated system includes one or more central processing units 10 and 12, which have associated therewith a plurality of input/output terminals each designated generally by the reference numeral 14. A plurality of control units 16 are provided to connect the input/output terminals 14 to the central processing units 10 and 12. In the preferred embodiment of the invention, the control units are provided for interfacing and multiplexing the input/output terminals connected thereto with one or more of the central processing units. Such devices are well known in the prior art, e.g., the IBM 3274 Control Unit. This control unit can attach up to 32 displays, serial matrix printers and/or line printers. Referring back to FIG. 1, the integrated data processing/text processing system may also include a communications multiplexer 18 which connects a plurality of control units 16 to one or more central processing units. Preferably, the control units are connected to the communications multiplexer 18 by modem links 20 and the communications multiplexer is connected to the CPU 12 by a local channel link 22. As seen in FIG. 1, the control units 16 are also connected to the central processing units via local channel links 22, however, these devices may be remotely attached if desired.

It is known in the prior art to connect a conventional text processor to a central processing unit to allow the text processor to alternatively function as a data display terminal for the host CPU. As disclosed in copending U.S. patent application Ser. No. 310,184, filed Oct 9, 1981, to Clements et al., now U.S. Pat. No. 4,458,311 a conventional text processor 24 and its associated display or printer 26, is connected via a communications multiplexer 18 and modem link 28 to the central processing unit 10. As discussed in this copending application, the text processor 24 is capable of switching from an initiated text processing session to a data processing session wherein the text processor 24 emulates a control unit and associated input/output terminals which process link data under the control of the host central processing unit 10. As used herein, the term "link data" refers to data normally associated with data processing whereas the term "text character data" refers to data normally associated with text processing. These terms are not necessarily mutually exclusive, but are used simply for convenience to emphasize that the conventional text processor does not normally process link data.

While utilization of a text processor as a display and/or printer for a host central processing unit has produced satisfactory results, such a combination does not allow the user to process the formatted data before it is output on the display or transmitted to the central processing unit. This is essentially because the text processor cannot support the protocol normally associated with a control unit in a host data processor configuration. Moreover, this approach does not allow simultaneous yet independent use by the central processing unit of both the display and printer associated with the text processor. According to the present invention, both of these capabilities are provided in an integrated data processing/text processing system. Referring to FIG. 1, each of the control units 16 has a plurality of output ports, each of the ports connected to an input/output terminal for interfacing and multiplexing the input/output terminal with one or more of the central processing units. For example, control unit 16a includes an output port 30 connected to a conventional text processor 32 via a coaxial cable 34. The text processor 32 includes an output device such as a display or printer 36. As will be described in more detail below, in accordance with one feature of the present invention, the text processor 32 is utilized to enhance the function of the input/output terminal incorporating this processor. In particular, the text processor 32 is utilized to both process the data to be displayed on the display or printer 36, and/or to process the data to be transmitted over the coaxial link 34 back to the central processing unit 12. Of course, the text processor 32 may also be used in its conventional fashion to process text character information to the display or printer 36.

In accordance with another important feature of the present invention, at least one of the input/output terminals 14 of FIG. 1 may be used to emulate a pair of output devices normally associated with a central processing unit. For example, the IBM 3278 Display Station is typically used in clusters with the IBM 3274 Control Unit for displaying alphanumeric data and for entering data into and receiving data from a central processing unit. Similarly, the IBM 3287 Printer provides hard copy output capability to the IBM 3274 configuration. Often, a user desires both the text processing functions of a text processor and access to a host processing unit for data processing through a low cost data link. To this end, at least one input/output terminal 14 of the present invention includes a text processor 38 which is connected to ports 40 and 42 of the control unit 16b via coaxial cables 44 and 46. The text processor has associated therewith a display and printer 48. As will be described in more detail below, the text processor 38, and its associated display and printer, may be utilized to emulate the display and printer normally associated with the CPU 10, e.g., an IBM 3278 Display Station and an IBM 3287 Printer.

As also seen in FIG. 1, at least one of the input/output terminals 14 may be connected to both control units 16a and 16b via the coaxial cables 50 and 52, respectively. In this manner, a text processor 54, and its associated display and printer 56, communicates with both of the central processing units 10 and 12. As discussed above, however, the dual emulation capability facilitated by such a connection is transparent regardless of whether the host is the same central processing unit, or separate central processing units accessing the terminal through a pair of control units.

Figure 2:
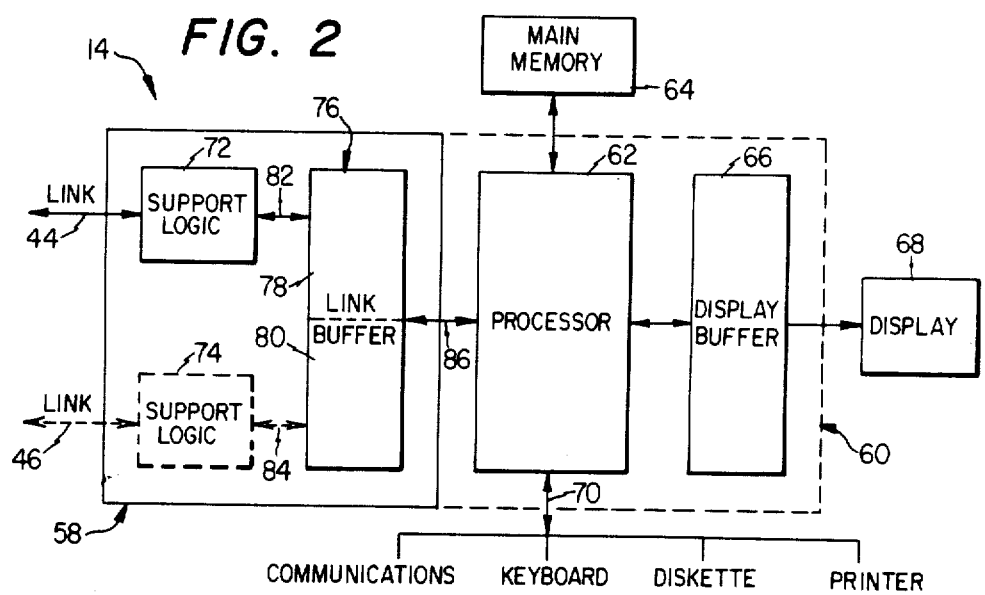
FIG. 2 is a block diagram of one of the input/output terminals of FIG. 1 in accordance with the present invention.

Referring now to FIG. 2, a block diagram of one of the input/output terminals 14 of the present invention is shown in detail. This input/output terminal includes an adapter section 58 and a text processor section 60. The text processor section 60 includes a conventional processor 62, associated main memory 64, and a display buffer 66. The output of the display buffer 66 drives a conventional display 68. The processor has access to a printer via bidirectional data bus 70. Input to the processor 62, which is provided over bidirectional data bus 70, may also take the form of communications, keyboard input, or information from an external storage such as a diskette. For example, text character information may be input via a keyboard and processed according to a computer program stored in the main memory 64 or the diskette. In the conventional operation of the text processor section 60, text character information is processed by the processor 62 and applied to the display buffer 66 or printer via bidirectional data bus 70. The buffer then outputs the processed text character information to the display 68.

In accordance with the present invention, the input/output terminal 14 of FIG. 2 includes an adapter section 58 which includes support logic circuits 72 and 74, and a link buffer 76. As will be described in detail below, the support logic circuit 74 is optional as indicated by the dotted line. Each of the support logic circuits 72 and 74 is connected via the coaxial cables 44 and 46, respectively, to one of the control units 16 as discussed above with respect to FIG. 1. The link buffer 76, which in the preferred embodiment of the invention is a random access memory (RAM), includes first and second sections 78 and 80 which communicate with the support logic circuits 72 and 74 via bidirectional data buses 82 and 84. As seen in FIG. 2, the link buffer 76 is connected to the processor 62 via a bidirectional data bus 86.

According to a first aspect of the present invention, an integrated data processing/text processing system is provided wherein at least one of the input/output terminals of FIG. 2. According to this aspect of the invention, the utilization of separate link and display buffers facilitates processing of link data received from or to be transmitted across the coaxial cables 44 and 46. In particular, in the prior art displays or printers associated with a host data processor, the data received from the link is generally passed directly to the output. For example, in the IBM 3278 Display Unit, received link data is simply signal processed and placed directly in a display buffer for display. In contradistinction, the adapter section 58 of the input/output terminal includes a distinct link buffer 76 for storing link data therein before such data is either output to the display and/or printer, or transmitted back to a central processing unit. Since the link data is not written directly into the display buffer, the processor 62 may be utilized to "add value" to such data before the output thereof to the display and/or printer. By way of example, if a data base is stored in conjunction with one of the central processing units of FIG. 1, this data base may be accessed by the input/output terminal and the link data therefrom formatted before being displayed or printed. Alternatively, this formatted data may be stored on a diskette and subsequently recalled and edited at a later time. Also, the processor 62 may be utilized to convert link data into a more easily understood language on the display screen associated with the text processor. It should be appreciated that such examples of "adding value" enhance the function of the input/output terminal to provide greater flexibility to the integrated data and text processing system. As discussed above, this processing of link data is transparent with respect to the host data processor, i.e., the host is unaware that the text processor is not merely displaying the transmitted data. Of course, the above examples of "adding value" are representative only, and it should be appreciated that the processor 62 may process the link data to the extent that it is capable of processing text character information.

According to the other important feature of the present invention, the adapter section 58 of the input/output terminal 14 of FIG. 2 includes the plurality of support logic circuits 72 and 74 for connecting a pair of data links to one or more of the control units 16 of FIG. 1. This is because the control unit cannot support more than one input/output device per coaxial cable without modification or non-transparent operation. This feature of the present invention is advantageous since it allows the input/output terminal 14 to simultaneously emulate two individual output devices normally associated with a control unit 16. By way of example only, the use of the plurality of support logic circuits 72 and 74 allows the input/output terminal 14 to emulate either two IBM 3278 Display Stations, two IBM 3287 Printers, or a combination of a 3278 Display and a 3287 Printer. Moreover, because a separate link buffer 76 is utilized as discussed above, this dual emulation function is totally transparent to the host central processing unit or units.

Figure 3:
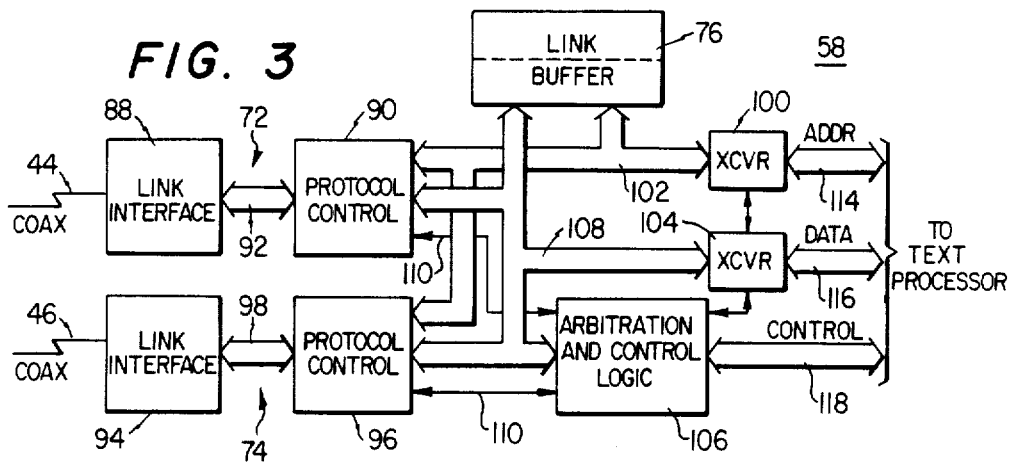
FIG. 3 is a block diagram showing the adapter section of the input/output terminal of FIG. 2.

Referring now to FIG. 3, a more detailed block diagram of the adapter section 58 of the input/output terminal is provided. In particular, support logic circuit 72 includes a link interface circuit 88 which is connected to the coaxial cable 44. The support logic circuit 72 also includes a protocol control circuit 90 which is connected to the link interface circuit 88 by the bidirectional data bus 92. Similarly, the support logic circuit 74 includes a link interface circuit 94 connected to a protocol control circuit 96 via the didirectional data bus 98. The input to the link interface circuit 94 is provided by the coaxial cable 46. As will be described in detail below, the link interface circuits 88 and 94 provide serializing and deserializing functions, as well as encoding and decoding functions; while the protocol control circuits 90 and 96 respond to a protocol unique to the system for allowing transfer of data from a central processing unit to an output device.

The protocol control circuits are connected to the link buffer 76 and a first transceiver 100 via a bidirectional address bus 102. These circuits are also connected to the link buffer 76, a second transceiver 104, and an arbitration and control logic circuit 106 via a bidirectional private data bus 108. The arbitration and control logic 106 also has control lines 110 connected to the protocol circuits 90 and 96. Bidirectional address, data and control buses 114, 116 and 118, are connected to the transceivers 100, 104 and the arbitration and control logic 106, respectively. These buses also connect to the processor 62 of FIG. 2.

In operation of the circuit of FIG. 3, the link interface circuits 88 and 94 provide the functions of encoding and decoding the serial bi-phase link data, along with providing amplification and means for driving data on the coaxial cables 44 and 46. These circuits also serialize and deserialize the link data stream and provide all the necessary timing to the protocol control circuits 90 and 96. Further, the link interface circuits provide the function of synchronizing the link data received from a control unit to the internal timing of the circuitry on the adapter section 58, as well as transmitting data with compatible timing for both interfaces.

The protocol control circuits 90 and 96 provide all the data manipulation and control functions to allow the input/output terminal to appear to the link as a conventional data display or printer. As will be described in more detail below, each protocol control circuit takes a synchronized word from its respective link interface circuit in parallel form and determines the action needed by that word. If the word is a valid command, the protocol control circuit proceeds through the sequential states necessary for acting on the command, whether it is to fetch data or to condition some internal control lines. The protocol control circuits are also responsible for generating a response and initiating it through their respective link interface circuits.

The function of the arbitration and control logic 106 is to provide arbitration and grant internal time slots to the display and printer devices associated with the text processor. In particular, since the timings of the two links and the processor control bus 118 are all asynchronous to one another, time slots are allocated on the private data bus 108 to allow timely access to the link buffer 76 by all of the interfaces. The arbitration and control logic 106 determines priorities and grants the time slots to the devices. By allowing the processor 62 to access the link buffer 76, the arbitration and control logic enables the processor to "add value" to the link data stored therein. This circuit also provides master timing to the adapter section, along with master and slave clocks for data movement. Finally, the transceivers 100 and 104 are provided to transform the data on the bidirectional address and data buses 114 and 116 to a form compatible for use with the adapter section 58 circuitry.

Therefore, in accordance with the present invention, the adapter section 58 provides all the necessary hardware by obeying the link protocol, thus allowing the processor to access and control link functions. The adapter section 58 of the input/output terminal meets the required timing specifications on the two simultaneous links, but allows the links to be maintained by the software of the text processor. Such a system allows the processor to "add value" to the link data, thus enhancing the function of the integrated text and data processing system.

Figure 4:
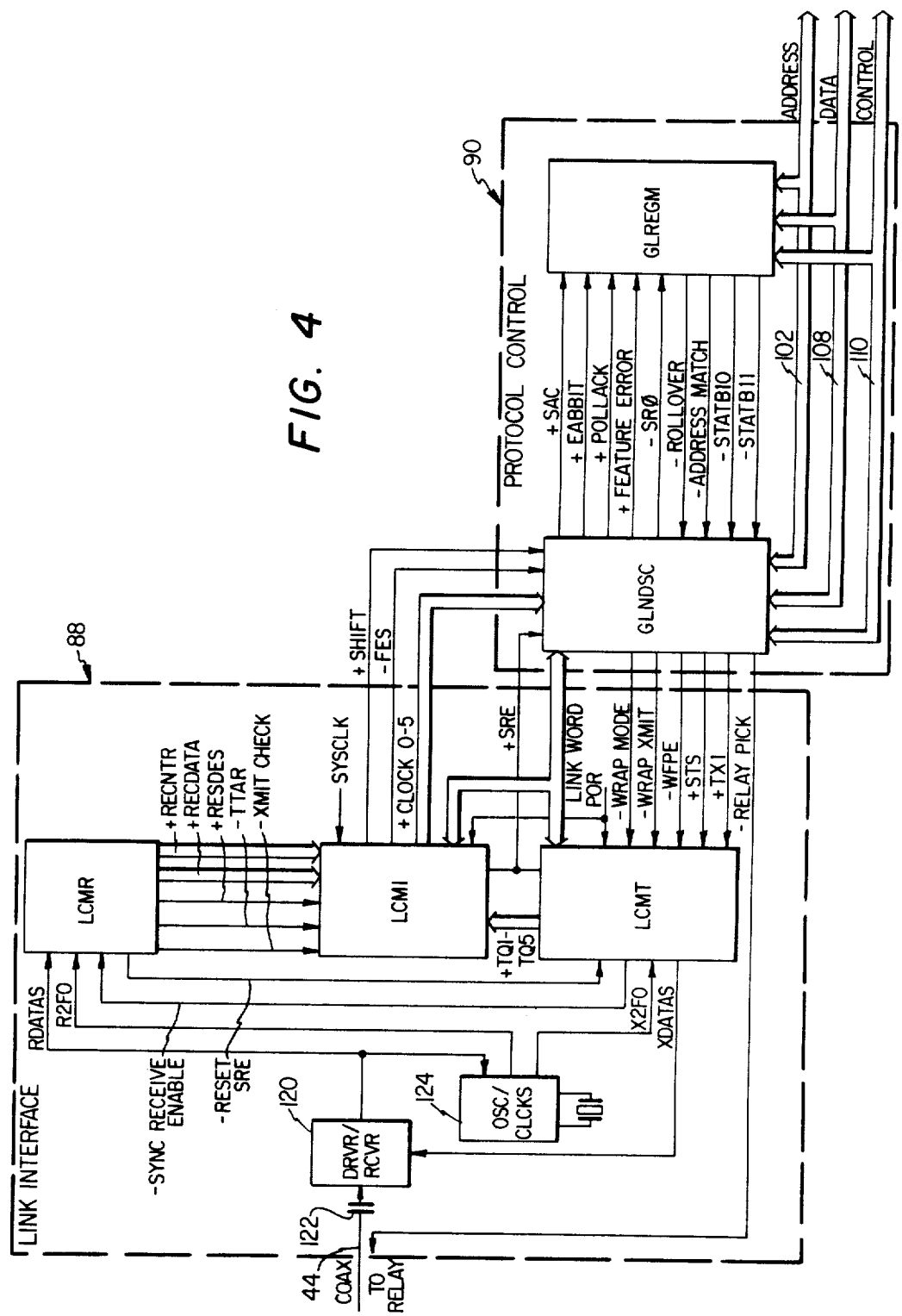
FIG. 4 is a schematic diagram of the protocol control and link interface circuits of FIG. 3 for one of the support logic circuits of FIG. 2.

Referring now to FIG. 4, a schematic diagram of one of the link interface circuits and one of the protocol control circuits of FIG. 3 is provided. It should be appreciated that the adapter section 58 includes identical hardware for the second coaxial link. With reference to FIG. 4, the coaxial cable 44 is connected to a driver/receiver circuit 120 via a capacitor 122. The link interface circuit also includes an oscillator module 124 for providing clock signals to the modules LCMR and LCMT. The outputs of the modules LCMR and LCMT are provided to another module LCMI. In operation, the driver/receiver circuit 120 essentially provides the necessary encoding and decoding functions of the link data while the LCMT and LCMR modules provide serialization and deserialization thereof, respectively. Specifically, serial 12 bit data words or protocol commands are applied via the coaxial cable 44 to the link interface circuit. This received data is decoded by the driver/receiver circuit 120 and then transferred via the RDATAS line to the LCMR module, where associated synchronization and parity bits are removed. The multiplexed data words are then transferred to the LCMI module where the data is deserialized. The words are then applied to the protocol control circuit via the bidirectional data bus LINK WORD.

As seen in FIG. 4, each of the protocol control circuits of FIG. 3 include two mudules, a GLNDSC control module, and a GLREGM register module. These modules are connected to the bidirectional address, data and control buses 102, 108 and 110, respectively, The GLNDSC module receives the synchronized word on the bidirectional LINK WORD data bus from the associated link interface circuit and determines the action needed by that word. As will be described in more detail below, the GLNDSC module proceeds through the sequential states necessary for acting on that command, whether it is to fetch data or to condition some internal control lines. This module is also responsible for generating a response and initiating it through the link interface circuit. In particular, the GLNDSC module is connected to the LCMT module of the link interface circuit. The LCMT module serializes the parallel response word received from the GLNDSC module and transfers this word in serial form to the driver/receiver circuit 120 via the XDATAS line. The GLNDSC module is also connected to the LCMT module by a plurality of control lines. For example, the control line titled WRAP MODE forces the link interface modules into a wrap mode state, whereas a signal applied on the WRAP XMIT control line instructs the link interface circuit to transmit data back to the control unit and central processing unit. The other control lines connecting the GLNDSC module and the LCMT module in the link interface circuit provide various specific control functions.

The GLNDSC and GLREGM modules in the protocol control circuit of FIG. 4 are also connected via a plurality of command lines as shown. For example, the control line POLLACK is utilized to indicate to the register module that a poll acknowledge command has been received from one of the control units. The remainder of the command lines provide other commands between these two modules of the protocol control circuit. Note that the GLNDSC module of the protocol circuit includes a RELAY PICK line for sending a control signal to a relay, within the input/output 14. This signal controls the actuation of the relay, allowing the link interface circuit to be connected or disconnected from the coaxial cable 44.

Figure 5:
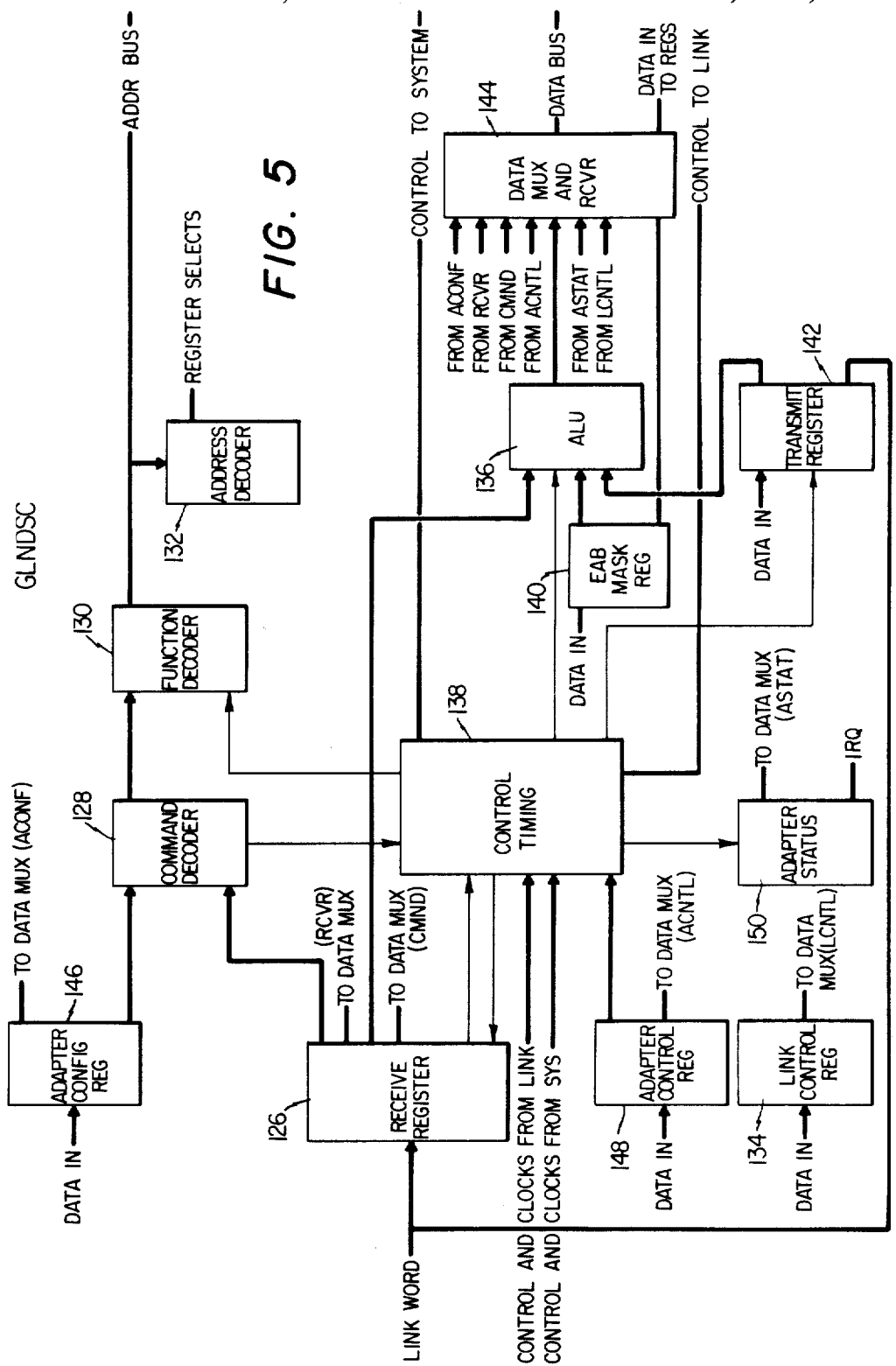
FIG. 5 is a schematic diagram of the GLNDSC module of the protocol control circuit of FIG. 4.

Referring now to FIG. 5, a detailed schematic diagram of the GLNDSC module of FIG. 4 is shown. This module includes a number of functional blocks which are utilized by the protocol associated with the present system. This desired protocol, entitled NDS, has been utilized between an IBM 3274 Control Unit and either the IBM 3278 Display Station or the IBM 3287 Printer. The NDS protocol is a high-speed, asynchronous serial protocol wherein data to be transmitted or received over the coax link has a bit rate of 2.3587 MHz., and is encoded using a binary di-pulse technique. In accordance with this protocol, 12 bits are assembled to form one word for transmission over the coax link. The first bit of the 12 bit word is a synchronizing bit and the last bit is a parity bit. A word from a control unit 16 of FIG. 1 to the input/output terminal 14 will be either a command word or a data word. According to the protocol, an error condition will result if the input/output terminal fails to turn the line around and respond to a command within 5.5 microseconds. This protocol also invokes other stringent timing requirements on various high level commands sent by a control unit. In operation, the NDS protocol commands are designed to provide access to the link buffer from the coax link. There are also provisions for monitoring and modifying the status of the device being emulated by the text processor in the input/output terminal.

Referring back to FIG. 5, the GLNDSC module of the protocol control circuit includes a number of functional blocks which perform these and other functions of the NDS protocol. These blocks include the receive register 126, the command, function and address decoders 128, 130 and 132, respectively, the link control register 134, the arithmetic logic unit 136, the control timing circuit 138, the EAB mask register 140, the transmit register 142 and the data multiplexer and transceiver 144. These functional blocks are conventional in either the IBM 3278 Display Station or the IBM 3287 Printer and are utilized to respond to the NDS protocol commands. In accordance with the present invention, the GLNDSC module has been designed to include a plurality of additional registers which allow the processor 62 of FIG. 2 to emulate one of these work stations. To this end, the GLNDSC module includes an adapter configuration register 146, an adapter control register 148, and an adapter status register 150. All of these registers, and in particular the adapter control register 146, allow the processor 62 in the input/output terminal to access and control link functions. For example, under software control these registers interrupt the processor 62 when link activity is detected that will affect the contents or state of the display screen. Also, to further reduce the load on the processor, these registers provide status indications as to which sections of the display require updates. This feature limits the amount of data that has to be transferred from the link buffer 76 to the display buffer 66 of FIG. 2 when link activity has been detected. It should be appreciated that the contents of the link buffer are transferred to the display buffer under software control.

Figure 6:
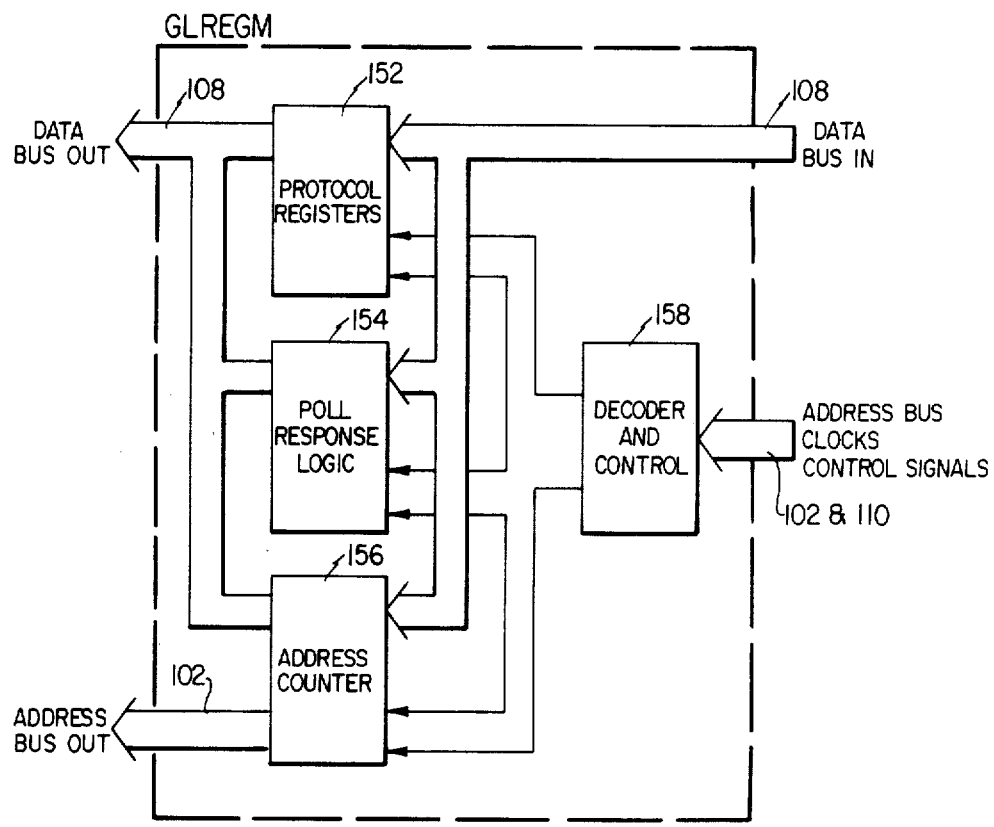
FIG. 6 is a schematic diagram of the GLREGM module of the protocol control circuit of FIG. 4.

Referring now to FIG. 6, a detailed schematic of the register module GLREGM of the protocol control circuit of FIG. 4 is shown. More specifically, the GLREGM module includes protocol registers 152, poll response logic 154, address counter logic 156, and decode and control logic 158. As discussed above with respect to FIG. 4, the GLREGM module connects to the bidirectional address, data and control buses 102, 108 and 110, respectively. The protocol registers 152, the address counter logic 156, and the decode and control logic 158 are function blocks utilized by the NDS protocol, and need not be described in detail. However, the poll response logic 152 has been added to the prior art NDS protocol control circuit to facilitate processor access to the data link.

Referring to FIG. 7, the poll response logic 154 of FIG. 6 is shown in detail. This circuit includes a control logic register 160, a keyboard FIFO control register 162, keyboard FIFO registers 164 and 166, priority register 168, poll response registers 170 and 172, and an output multiplexer 174. As seen in FIG. 7, the poll response logic 154 is connected to the bidirectional data and control buses 108 and 110 of FIG. 3.

Referring simultaneously to FIGS. 4-7, an example of the operation of the hardware described therein will now be provided. By way of example only, it should be appreciated that the GLNDSC module of the protocol control circuit of FIG. 4 is continually polled by its associated control unit to determine the status of the display or printer associated therewith. A "poll" simply inquires whether there has been any activity in the terminal since the last poll. Moreover, the GLNDSC module may also receive a read data command, requesting transfer of link data in the link buffer to the central processing unit; or in the alternative, a write command for controlling transfer of link data from the central processing unit to the link buffer.

Since a poll response must begin within 5.5 microseconds, such responses must be set up before a poll is received by the protocol control circuit. Referring to FIG. 7, poll responses are set up in the registers 170 and 172 by the processor and the priority register 168 prioritizes these poll responses. Therefore, when a poll comes in on the link, it is decoded by the link interface circuit, and in response thereto, the GLNDSC module accesses the poll response registers to transmit the required information back to the associated control unit. It should be noted that the keyboard FIFO registers 164 and 166, in conjunction with the keyboard FIFO control 162, buffer the keystrokes input from the processor and check for keystroke overrun. The use of the keyboard FIFO registers 164 and 166 ensure that keystrokes are presented to the data link in a transparent fashion.

If a write data command is received over the coax line, it is decoded by the link interface circuit and presented to the GLNDSC module of the protocol control circuit of FIG. 4. In response thereto, the GLNDSC module accesses its associated section of the link buffer and prepares this section for receipt of link data. The received link data is then transferred to the link buffer via the bidirectional data bus 108 and stored therein as controlled by address signals supplied by the GLREGM module via the bidirectional address bus 102. To the contrary, if a read command is received by the GLNDSC module, link data is read from the link buffer and transmitted over the coax link to the respective control unit.

Therefore, in accordance with the present invention, an input/output terminal for use in an integrated text and data processing system is provided which allows processing of link data before output and which provides simultaneous dual emulation of a display and printer normally associated with a host data processor. In accordance with a first important feature of the present invention, an input/output terminal includes a distinct link buffer which receives link data from the coaxial link. Since the input/output terminal includes a processor, the functional capability of this terminal is enhanced according to the present invention since the link data can be processed before being output. For example, the link data can be transferred from the link buffer to a diskette, or keystrokes can be input to the processor to manipulate this data into some other form in accordance with a program stored in the main memory of the text processor. Alternatively, information provided via an external communications device, such as another central processing unit or text processor, may be utilized to process this data in some further fashion. It should be appreciated that this "added value" capability is only limited by the capabilities of the text processor itself.

In accordance with another important feature of the present invention, the input/output terminal includes an adapter section having the necessary hardware for allowing the processor to access a pair of coax links. As discussed in detail above, this hardware facilitates the connection of the pair of links to the input/output terminal, thereby allowing the text processor to simultaneously emulate both a display and printer normally associated with a central processing unit. In the preferred embodiment of the invention, both of the above arrangements proceed through an intermediate multiplexing control unit having a plurality of output ports. Through the use of the present invention, the input/output terminal allows effective processing of link data before output and provides simultaneous dual emulation of a display and printer normally associated with a host data processor.

Although the invention has been described and illustrated in detail, it is to be clearly understood that the same is by way of illustration and example only and is not to be taken by way of limitation. The spirit and scope of this invention are to be limited only by the terms of the appended claims.

We claim:

1. In an integrated data processing/text processing system comprising one or more central processing units having peripheral devices normally associated therewith, a plurality of input/output terminals for each of said central processing units, and one or more control units having a plurality of ports, each of said ports connected to an input/output terminal for interfacing and multiplexing the input/output terminal with one or more of the central processing units, wherein at least one of the input/output terminals comprises:
   a plurality of support logic means each connected to one of the ports of one or more of said control units;
   a link buffer connected to each of said support logic means for storing link data received from or to be transmitted to one of said central processing units, the link data normally associated with a data processing task;
   a text processor connected to said link buffer and to each of said support logic means;
   input means connected to said text processor for adding value to the link data while said link data is stored in the link buffer to produce processed link data, the input means also for inputting text character data normally associated with a text processing task;
   output means, including a display buffer and a plurality of peripheral devices, connected to said text processor for outputting said processed link data and said text character data, wherein each of said peripheral devices of said output means cooperates with one of said support logic means to enable the text processor to simultaneously emulate the peripheral devices normally associated with said central processing units.

2. The integrated data processing/text processing system of claim 1 wherein said plurality of peripheral devices of said output means includes one or more displays associated with said text processor.

3. The integrated data processing/text processing system of claim 2 wherein said plurality of peripheral devices of said output means includes one or more printers associated with said text processor.

4. The integrated data processing/text processing system of claim 2 wherein said display printer stores said processed link data and said text character data before output thereof to said one or more displays.

5. The integrated data processing/text processing system of claim 1 wherein each of said support logic means is connected to one of said ports by a coaxial cable.

6. The integrated data processing/text processing system of claim 1 wherein each of said support logic means is responsive to an asynchronous serial protocol associated with one or more of said control units.

7. The integrated data processing/text processing system as described in claim 6 wherein each of said support logic means further includes link interface means for encoding and decoding, and serializing and deserializing said link data and protocol commands received from said one or more control units.

8. The integrated data processing/text processing system as described in claim 7 wherein each of said support logic means further includes protocol control means connected to said link interface means and responsive to protocol commands for controlling the movement of said data link throughout said input/output terminal.

9. The integrated data processing/text processing system of claim 8 wherein said link buffer includes first and second sections, said first section connected to the protocol control means of one of said support logic means, and said second section connected to the protocol control means of said other support logic means.

10. The integrated data processing/text processing system of claim 9 wherein said input/output terminal further includes arbitration and control logic means for controlling access to said buffer by said text processor and said protocol control means of each of said support logic means.

11. In an integrated data processing/text processing system comprising a central processing unit, a plurality of input/output terminals for each said central processing unit, and a control unit having a plurality of ports, each of said ports connected to one of said input/output terminals for interfacing and multiplexing the input/output terminal with the central processing unit, wherein at least one of the input/output terminals comprises:
   support logic means for interconnecting the input/output terminal to one of the ports of said control unit;
   a link buffer connected to said support logic means for storing link data received from or to be transmitted to said central processing unit, the link data normally associated with a data processing task;
   a text processor connected to said link buffer and to said support logic means;
   input means connected to said text processor for adding value to the link data while said link data is stored in said link buffer in a manner transparent to the central processing unit to produce processed link data, said input means also for inputting text character data normally associated with a text processing task; and
   output means including a display buffer, a printer and a display associated with the text processor for outputting said processed link data and said text character data.

12. The integrated data processing/text processing system of claim 11 wherein said support logic means is responsive to an asynchronous serial protocol associated with said control unit.

13. The integrated data processing/text processing system as described in claim 12 wherein said support logic means includes link interface means for encoding and decoding, and serializing and deserializing said link data and protocol commands received from said control unit.

14. The integrated data processing/text processing system as described in claim 13 wherein said support logic means further includes protocol control means connected to said link interface means and responsive to said protocol commands for controlling the movement of said link data in said input/output terminal.

15. The integrated data processing/text processing system as described in claim 14 wherein said protocol control means includes poll response logic means for responding to polls transmitted to said input/output terminal from said control unit.

* * * * *

UNITED STATES PATENT AND TRADEMARK OFFICE
CERTIFICATE OF CORRECTION

PATENT NO. : 4,603,385
DATED : July 29, 1986
INVENTOR(S) : S. F. Clements et al

It is certified that error appears in the above—identified patent and that said Letters Patent is hereby corrected as shown below:

Column 12, line 14, "data link" should read --link data--.

Signed and Sealed this

Twenty-seventh Day of January, 1987

*Attest:*

DONALD J. QUIGG

*Attesting Officer*   *Commissioner of Patents and Trademarks*